US009424188B2

(12) United States Patent
Amidi et al.

(10) Patent No.: US 9,424,188 B2
(45) Date of Patent: Aug. 23, 2016

(54) NON-VOLATILE MEMORY PACKAGING SYSTEM WITH CACHING AND METHOD OF OPERATION THEREOF

(75) Inventors: Mike H. Amidi, Lake Forest, CA (US); Michael Rubino, San Jose, CA (US); Alessandro Fin, Los Gatos, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 95 days.

(21) Appl. No.: 13/303,818

(22) Filed: Nov. 23, 2011

(65) Prior Publication Data
US 2013/0132639 A1 May 23, 2013

(51) Int. Cl.
*G06F 12/00* (2006.01)
*G06F 12/08* (2016.01)
*G06F 13/16* (2006.01)
*G06F 3/06* (2006.01)

(52) U.S. Cl.
CPC .......... *G06F 12/0804* (2013.01); *G06F 3/0661* (2013.01); *G06F 13/16* (2013.01); *G06F 2212/2022* (2013.01); *G06F 2212/3042* (2013.01)

(58) Field of Classification Search
CPC ............................. G06F 13/16; G06F 3/0661
See application file for complete search history.

(56) References Cited

U.S. PATENT DOCUMENTS

| 6,118,724 | A * | 9/2000 | Higginbottom | 365/230.05 |
|---|---|---|---|---|
| 6,185,664 | B1 * | 2/2001 | Jeddeloh | 711/167 |
| 7,945,728 | B1 | 5/2011 | Sutardja | |
| 7,949,910 | B2 | 5/2011 | Kanno et al. | |
| 7,953,954 | B2 | 5/2011 | Ly et al. | |
| 2002/0083269 | A1 * | 6/2002 | Sturges et al. | 711/129 |
| 2007/0101115 | A1 * | 5/2007 | Murakami | 713/1 |
| 2007/0106836 | A1 * | 5/2007 | Lee et al. | 711/103 |
| 2008/0147968 | A1 * | 6/2008 | Lee et al. | 711/103 |
| 2008/0209112 | A1 * | 8/2008 | Yu et al. | 711/103 |
| 2009/0164703 | A1 * | 6/2009 | Racino | G06F 13/4239 711/103 |
| 2010/0125695 | A1 * | 5/2010 | Wu et al. | 711/103 |
| 2011/0119442 | A1 | 5/2011 | Haines et al. | |
| 2011/0131365 | A1 | 6/2011 | Zhang et al. | |
| 2012/0191292 | A1 * | 7/2012 | McKee et al. | 701/33.1 |

* cited by examiner

*Primary Examiner* — Charles Rones
*Assistant Examiner* — Tian-Pong Chang
(74) *Attorney, Agent, or Firm* — Wong & Rees LLP

(57) ABSTRACT

A method of operation of a non-volatile memory packaging system includes: addressing an integrated circuit package having a system interface; accessing a module controller, in the integrated circuit package, through system interface; accessing a random access memory, in the integrated circuit package, by the module controller for storing data from the system interface; writing to a non-volatile memory, in the integrated circuit package by the module controller, with the data from the random access memory; and monitoring an address look-up register, by the module controller, for reading the data from the non-volatile memory or the random access memory through the system interface.

20 Claims, 7 Drawing Sheets

NON-VOLATILE MEMORY PACKAGING SYSTEM WITH CACHING AND METHOD OF OPERATION THEREOF

TECHNICAL FIELD

The present invention relates generally to a non-volatile memory packaging system, and more particularly to a system for packaging a non-volatile memory with performance enhancing hardware.

BACKGROUND ART

Personal computers have become mainstream computing devices for the past two decades. One of the core components of a personal computer whether desktop or laptop is a mother board, which is the central or primary circuit board providing attachment points for one or more of the following: processor (CPU), graphics card, sound card, hard disk drive controller, memory (Random Access Memory (RAM), Read-Only Memory (ROM)), and other external devices. Traditionally, hard disk drives have been used as storage in a computing device.

With the advance of non-volatile memory (e.g., flash memory), some attempts have been made to use non-volatile memory as the storage media of choice. Performance limitations, of the non-volatile memory, have prevented its use as primary storage memory.

Attempts to solve these problems at the card or subassembly level have employed various methods either separately, or in combination to improve the performance of the product. Approaches such as parallelism, interleaving, and various proprietary techniques, have been utilized with a controller managing multiple flash devices on a card or subassembly.

However, aside from the performance deficiencies there are problems of longevity associated with using flash memory. One of the main problems is that the life span of the flash memory is measured by number of times that the flash memory has been written (i.e., programmed) and erased. Operating systems tend to make many small alterations in memory due to the execution of programs and the storage of temporary data. An operating system characteristically exposes both of the weaknesses of non-volatile memory devices.

Thus, a need still remains for a non-volatile memory packaging system with caching that can provide enhanced performance and longevity of a non-volatile storage system. In view of the growing market in the personal computer and peripheral areas, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a non-volatile memory packaging system including: addressing an integrated circuit package having a system interface; accessing a module controller, in the integrated circuit package, through system interface; accessing a random access memory, in the integrated circuit package, by the module controller for storing data from the system interface; writing to a non-volatile memory, in the integrated circuit package by the module controller, with the data from the random access memory; and monitoring an address look-up register, by the module controller, for reading the data from the non-volatile memory or the random access memory through the system interface.

The present invention provides a non-volatile memory packaging system, including: an integrated circuit package having a system interface; a module controller, in the integrated circuit package, accessed through system interface; a random access memory, in the integrated circuit package, coupled to the module controller for storing data from the system interface; a non-volatile memory, in the integrated circuit package coupled to the module controller, for writing the data from the random access memory; and an address look-up register, in the module controller, for locating the data from the non-volatile memory or the random access memory.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
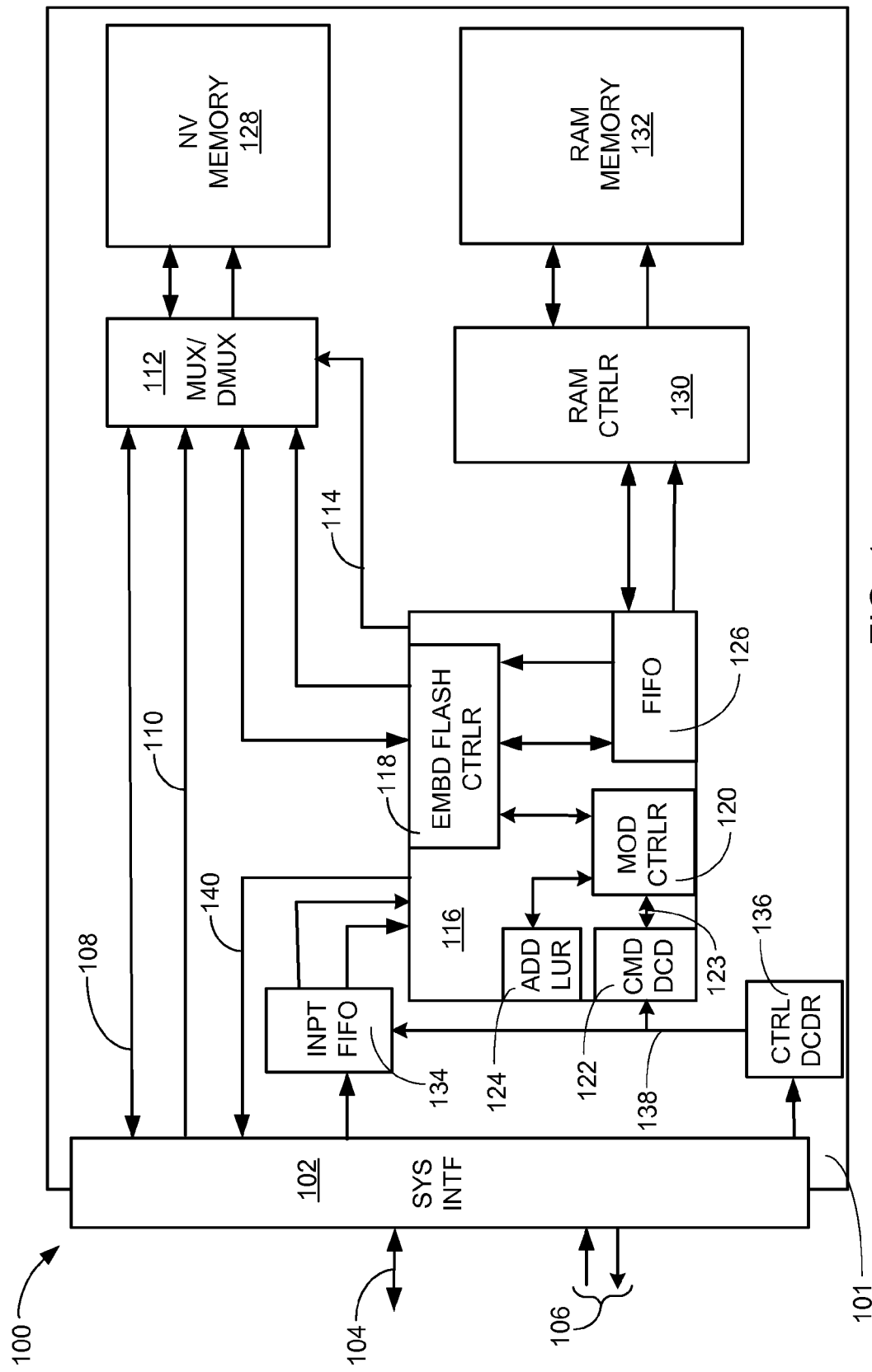
FIG. 1 is a functional block diagram of a non-volatile memory packaging system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals.

For expository purposes, the term "horizontal" as used herein is defined as a plane parallel to the plane or active surface of the NAND flash memory die, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

The term "processing" as used herein includes the manipulation of data between a system source to a targeted memory element. The term "FIFO" is defined to be a first in first out storage element capable of multiple accesses or dual port operation. The multi-chip package of the present invention is defined to be an integrated circuit package having multiple memory types, such as volatile memory and non-volatile memory, coupled to a control circuit for moving data content between the multiple memory types and a package interface.

The term "random access memory" as used in this application is defined to be a high-speed memory that provides a temporary storage of data. The term "cache" is defined as a storage element organized and supported by additional hardware to provide direct access to stored data held within the storage element.

Referring now to FIG. 1, therein is shown a functional block diagram of a non-volatile memory packaging system 100 in an embodiment of the present invention. The functional block diagram of the non-volatile memory packaging system 100 depicts an integrated circuit package 101 with a system interface 102 having a system data bus 104, such as a bi-directional data interface, and a system control bus 106.

The system interface 102 can also include an internal interface data bus 108 for distribution of interface data within the non-volatile memory packaging system 100. An interface control bus 110 can also couple the system interface 102 to a routing multiplexer 112. The routing multiplexer 112 is defined as an electronic switch that directs the internal interface data bus 108 and the interface control bus 110 to or from multiple devices.

The routing multiplexer 112 can be controlled by a port select bus 114 that is managed by a module controller 116. The module controller 116 is defined as a control circuit that includes an embedded flash controller 118 and is operationally controlled by a module processor 120, such as a microprocessor, a bit slice processor, or a sequential state machine. The module controller 116 also includes an embedded command decoder 122, an address look-up register 124, a speed matching register 126, such as a speed matching FIFO register, and associated support logic and buffers (not shown). The module controller 116 can also include counters, registers, and comparators for managing data movement within the non-volatile memory packaging system 100.

The embedded command decoder 122 can provide an interpretation of the system control bus 106 in the form of operation decodes 123, such as a write command decode, a read command decode, an erase command decode, a reset decode, a read ID decode, or a status decode. It is understood that other command decodes are possible and while the individual types of the operation decodes 123 are not shown they are all inputs to the module processor 120.

The address look-up register 124 can be implemented as a hardware register for maintaining the address and length of data stored by the module controller 116. The address look-up register 124 can be of sufficient size top to reference the range of addresses available to the module controller 116. The speed matching register 126 can be a register array capable of multiple accesses or dual port operation for transferring data between bus structures having different speeds and bit organization.

The module controller 116 can coordinate the movement of data from the system data bus 104, through the system interface 102, to the internal interface data bus 108. The port select bus 114 sourced from the module controller 116 establishes a path through the routing multiplexer 112 to a non-volatile memory 128, such as a NAND Flash or a NOR Flash, from the embedded flash controller 118, the internal interface data bus 108, or a combination thereof. The data that enters the module controller 116 through the embedded flash controller 118 can be moved to the speed matching register 126 and presented to a package RAM controller 130, which stores the data in a random access memory (RAM) 132. The random access memory 132 can include dynamic random access memory or static random access memory. The random access memory 132 can be a high speed volatile memory, that is incapable of retaining the data stored in it after a power cycle, or it can be implemented with high speed non-volatile memory, such as Magnetoresistive RAM (MRAM) or Phase Change Memory (PCRAM).

An input register 134, such as an input FIFO register, can be coupled to the system interface 102 as a speed matching buffer and diagnostic path to the module controller 116. The input register 134 can provide a data and control bus as well as an interrupt request. The module processor 120 can receive the interrupt request from the input register 134 in order to address a pending transfer or status request.

A control decoder 136 is coupled to the system interface 102 to accelerate the decoding of the commands presented by the system control bus 106. An output bus 138 of the control decoder 136 is coupled to the input register 134 and the module controller 116. The output bus 138 can convey a simplified decode from the control decoder 136 to the embedded command decoder 122 in order to reduce the execution time of the command by the module processor 120.

An output data bus 140 is sourced by the module controller 116 for transmission by the system interface 102. The output data bus 140 can include data that is stored in the random access memory 132 or the non-volatile memory 128, diagnostic data from the input register 134, or status information generated by the module processor 120. The output data bus 140 can also include control lines pertinent to the transfer of the data sourced from the module controller 116.

In operation of the non-volatile memory packaging system 100, power-up diagnostics are managed by the module controller 116. This allows a normal system boot process to perform diagnostic writes and reads without impacting any interaction between the non-volatile memory 128 and the random access memory 132.

At power-on time, the module controller 116 can map data that is stored in the non-volatile memory 128 to the random access memory 132. This process can allow immediate use of the data and programs that may have been present in the random access memory 132 prior to a power-off time.

It has been discovered that the use of the random access memory 132 as a caching structure provides enhanced write/ read performance for the non-volatile memory packaging system 100. The write/read execution time of the non-volatile memory packaging system 100 can be reduced to below 10% of the currently available flash memory devices (not shown).

It has further been discovered that by including all of the functions of the non-volatile memory packaging system 100 in the integrated circuit package 101, this performance improvement can be utilized by existing systems without modification to the hardware and without adding software drivers. The operation of the system interface 102 provides all of the legacy interface support, for timing and voltage levels, while the performance increase is provided by the module controller 116 utilizing the random access memory 132 as a cache for the non-volatile memory 128.

It has further been discovered that the non-volatile memory packaging system 100 can extend the operational life of the non-volatile memory 128 by reducing the number of write/read/and erase operations. Since the random access memory 132 is available for transitory write or read operations, it is not necessary to perform those operations on the non-volatile memory 128 which has a limited number of accesses in its operational life.

Figure 2:
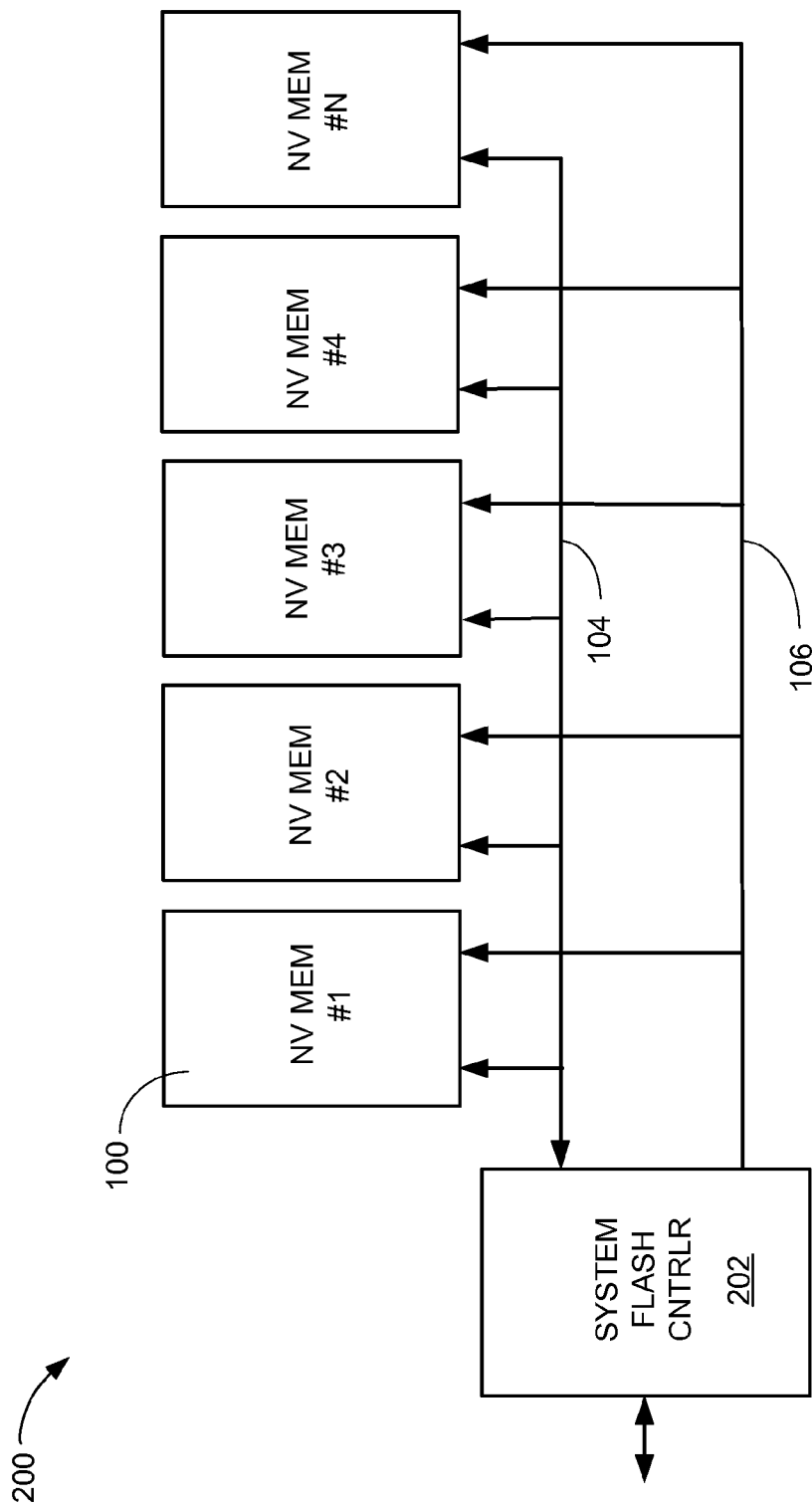
FIG. 2 is a functional block diagram of an application of the non-volatile memory packaging system of FIG. 1.

Referring now to FIG. 2, therein is shown a functional block diagram of an application 200 of the non-volatile memory packaging system 100 of FIG. 1. The functional block diagram of the application 200 depicts multiple units of the non-volatile memory packaging system 100 coupled to a system flash controller 202 through the system data bus 104 and the system control bus 106.

The system flash controller 202 can be a standard interface chip or device that provides an adaptive port for attaching the non-volatile memory packaging system 100. The system flash controller 202 can perform an auto configuration at power-on time in order to determine the relative performance of the non-volatile memories that are attached to the system data bus 104 and the system control bus 106.

The system flash controller 202 can read configuration data from the non-volatile memory packaging system 100 in order to determine the timing requirements of the package. The response to this request for performance information causes an interrupt to emanate from the input register 134, of FIG. 1, to the module controller 116, of FIG. 1. The module processor 120 of FIG. 1 provides the response to the read configuration data request from the system flash controller 202.

By way of an example, the non-volatile memory packaging system 100 is shown with five units coupled to the system flash controller 202 but it is understood that any number may be so coupled. The performance increase, of in excess of 10 times that of standard flash memory, is provided for each of the individual units of the non-volatile memory packaging system 100. Having the multiple units of the non-volatile memory packaging system 100 increases the capacity addressed by the system flash controller 202.

Figure 3:
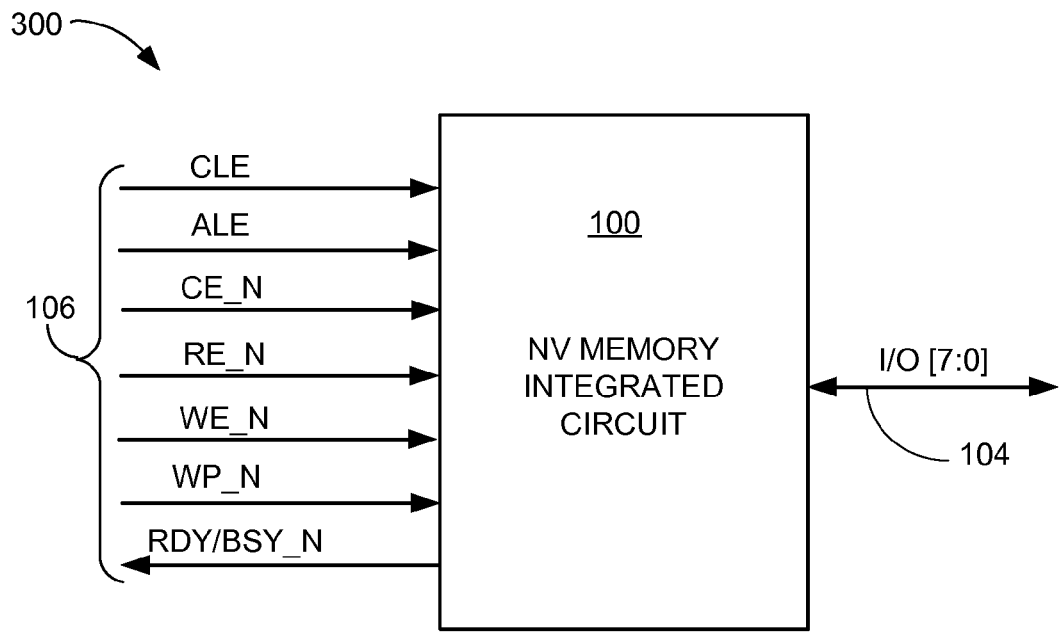
FIG. 3 is a block diagram of an interface of the non-volatile memory packaging system of FIG. 1.

Referring now to FIG. 3, therein is shown a block diagram of an interface 300 of the non-volatile memory packaging system 100 of FIG. 1. The block diagram of the interface 300 depicts the system control bus 106, which can include a command latch enable (CLE), address latch enable (ALE), chip enable active low (CE_N), read enable active low (RE_N), write enable active low (WE_N), write protect active low (WP_N), and ready (RDY/BSY_N). In the system control bus 106, only the RDY/BSY_N signal is an output from the non-volatile memory packaging system 100.

The system data bus 104 is a bi-directional bus used to transfer, data, status, configuration information, diagnostic data, or a combination thereof. The system data bus 104 is a bi-directional bus can be driven by the non-volatile memory packaging system 100 or the system flash controller 202, of FIG. 2. The system data bus 104 is shown to have eight bits but it is understood that this is an example only and other configurations are possible. The non-volatile memory packaging system 100 is a multi-chip package and can support additional data bus widths as necessary by adding or changing the configurations of the chips.

Figure 4:
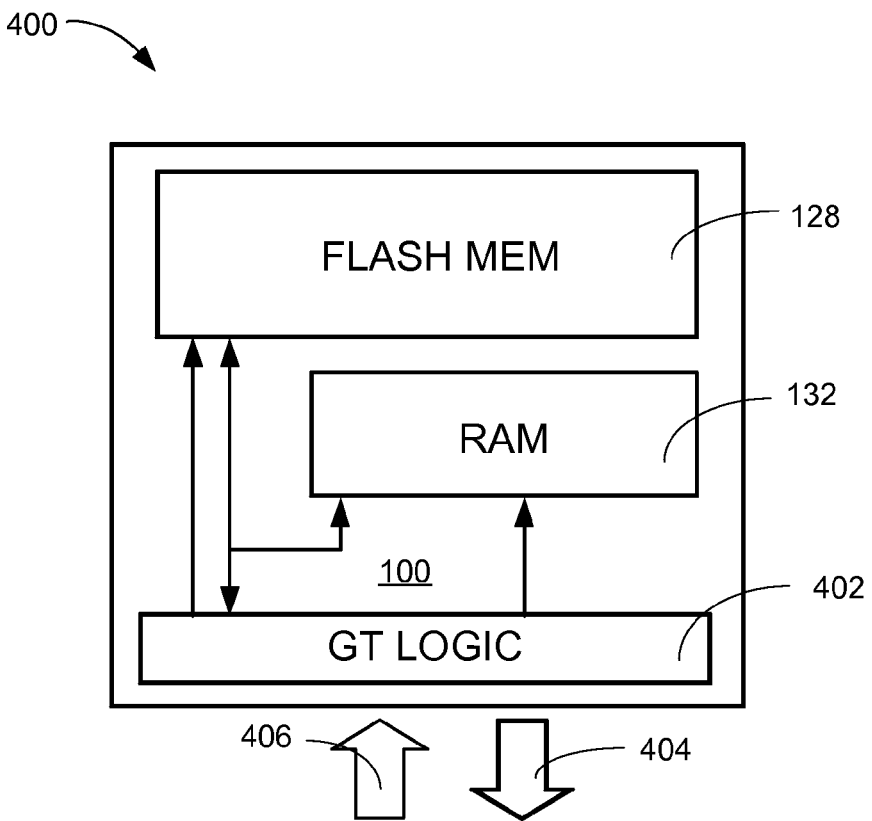
FIG. 4 is a chip level functional block diagram of a non-volatile memory packaging system.

Referring now to FIG. 4, therein is shown a chip level functional block diagram of a non-volatile memory packaging system 400. The chip level functional block diagram of the non-volatile memory packaging system 400 depicts the non-volatile memory packaging system 100 having a combinational interface logic 402, such as an integrated interface and control circuit for managing the flow of data between an output bus 404, an input bus 406, the non-volatile memory 128, the random access memory 132, or a combination thereof.

It is understood that the functions of the combinational interface logic 402 can be implemented in an application specific integrated circuit and combined in a multi-chip package. It is further understood that the functions of the non-volatile memory 128 and the random access memory 132 may be combined with the combinational interface logic 402 in a custom integrated circuit design as part of a single chip package.

Figure 5:
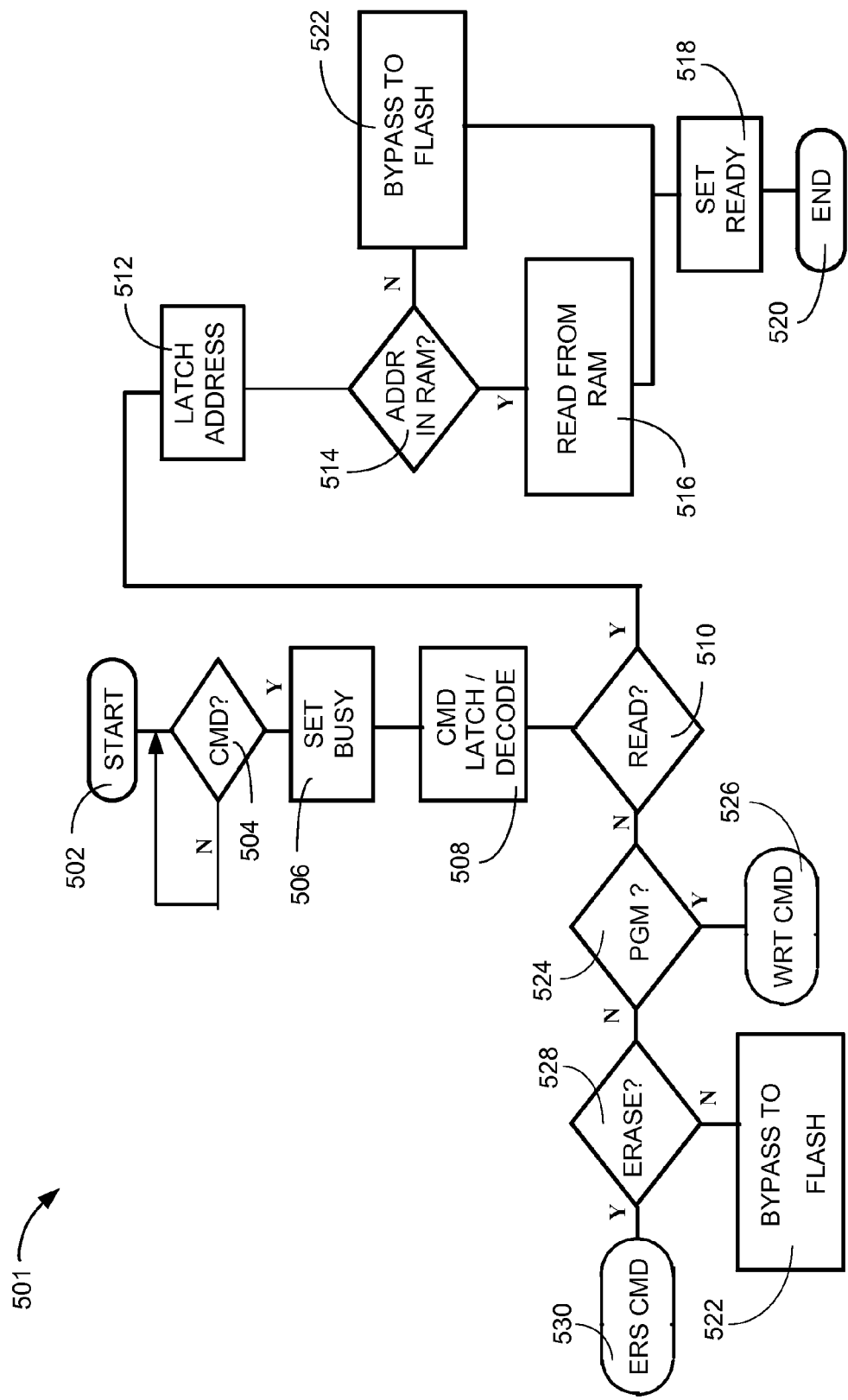
FIG. 5 is a first portion of an operational flow chart of the non-volatile memory packaging system.

Referring now to FIG. 5, therein is shown a first portion of an operational flow chart 501 of the non-volatile memory packaging system 100, of FIG. 1. The first portion of the operational flow chart 500 depicts an interrupt start 502 indicating that an event has occurred on the system control bus 106, of FIG. 1. A command detect block 504 can determine whether the interrupt start 502 was the result of a RESET or an operational command. If the command detect block 504 determines that the interrupt was not for an operational command, the flow returns to the entry of the command detect block 504 to await the execution of the RESET to clear the interrupt processing.

If the command detect block 504 determines that an operational command is pending, the flow proceeds to a set busy block 506, which negates the RDY/BSY_N interface line in the system control bus 106, as shown in FIG. 3. The flow then proceeds to a command latch decode block 508. The command latch decode block 508 can latch the pending command and decode the command lines in order to interpret the action required by the pending command.

A check for read block 510 can determine that the pending command is a read command and would proceed to a latch address block 512. The latch address block 512 captures the address of the data to be read by the pending read command. The flow then proceeds to an address in RAM decision block 514 can determine if the data requested by the pending read command is currently held in the random access memory 132, of FIG. 1. It is understood that the random access memory 132 is an internal memory that operates as a cache to hold previously written or read data. It is further understood that the operational performance of the random access memory 132 can be 500 to 1000 times faster than the operational performance of the non-volatile memory 128, of FIG. 1.

If the address in RAM decision block 514 determines that the data requested by the pending read command is located in the random access memory 132, the flow proceeds to a read from RAM block 516. The read from RAM block 516 will present the requested data on the system data bus 104, of FIG. 1 and the flow proceeds to an assert ready block 518 in order to assert the RDY/BSY_N interface line in the system control bus 106 in order to signal that the data is ready to be taken from the system data bus 104. The flow then proceeds to an interrupt end block 520 in order to complete the interrupt processing.

If the address in RAM decision block 514 determines that the data requested by the pending read command is not located in the random access memory 132, the flow proceeds to a bypass to flash block 522. The requested data is then retrieved from the non-volatile memory 128. The data is presented on the system data bus 104 and can be copied to the random access memory 132 for subsequent access. The flow proceeds to the assert ready block 518 in order to assert the RDY/BSY_N interface line in the system control bus 106 in order to signal that the data is ready to be taken from the system data bus 104. The flow then proceeds to the interrupt end block 520 in order to complete the interrupt processing.

It is understood that the data presented on the system data bus is in an eight bit or a "byte" interface format but the data request can represent a larger number of bytes. For example the requested data can represent a "sector" (equal to 512 bytes), a "page" (equal to 2K+64 or 2112 bytes), a "block" (equal to 64 pages or 132K or 135,168 bytes), or some other amount. By way of example an 8 Giga-byte (GB) version of the non-volatile memory packaging system 100 of FIG. 1 can include 8192 blocks of the data.

If the check for read block 510 can determine that the pending command is not a read command the flow would proceed to a check for PGM block 524. The check for PGM block 524 can determine if the command will write the data into the non-volatile memory packaging system 100. If the check for PGM block 524 determines that the pending command is a page program command the flow will proceed to a write command decode 526 in order to process the page program command. If however the check for PGM block 524 determines that the pending command is not a page program command the flow proceeds to a check erase block 528.

The check erase block 528 can determine whether the pending command is an erase command. If the check erase block 528 determines that the pending command is an erase command, the flow proceeds to an erase command decode 530 in order to process the pending erase command. If the check erase block 528 determines that the pending command is not an erase command the flow proceeds to the bypass to flash block 522. The pending command can be a status command or a configuration command.

Figure 6:
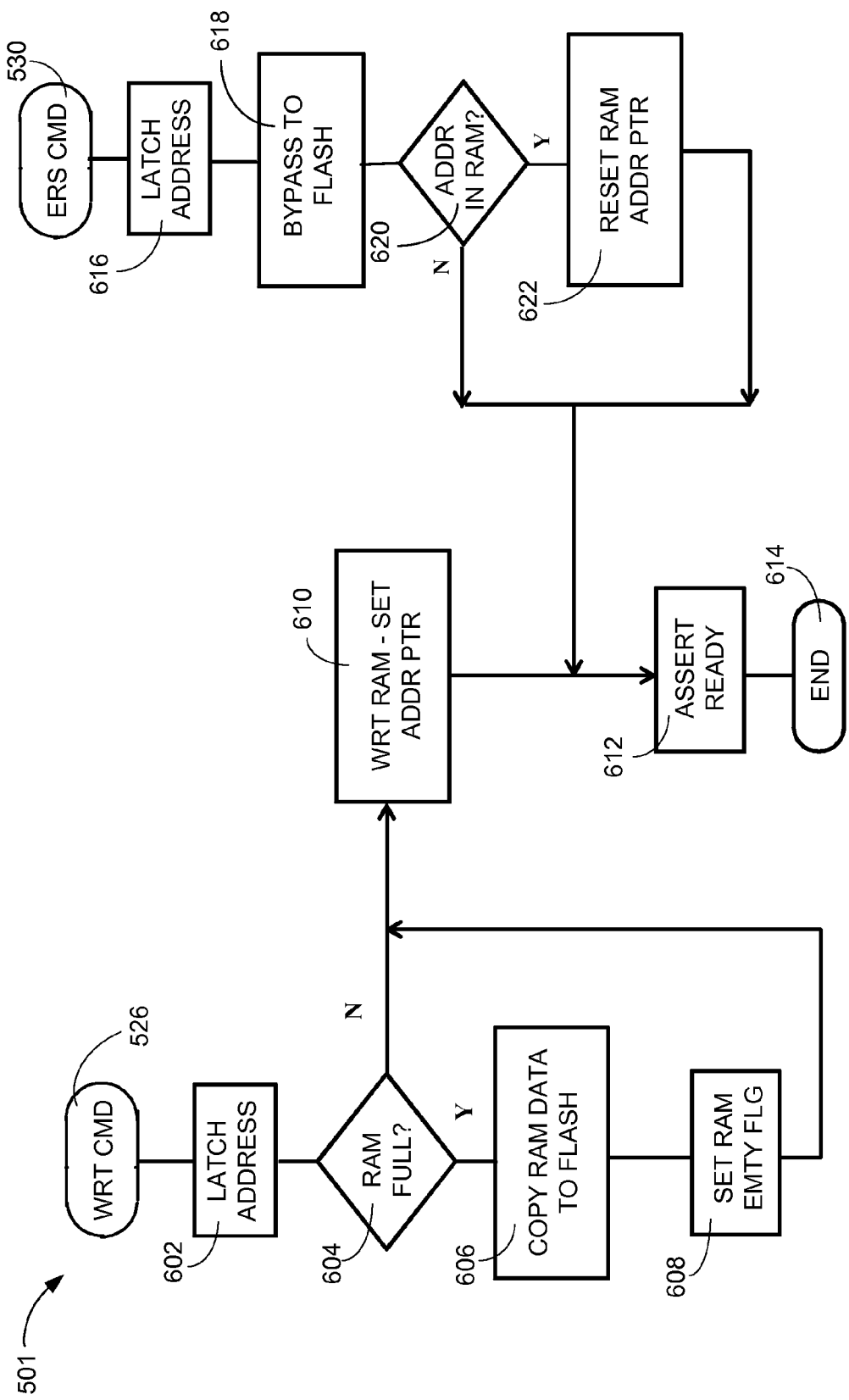
FIG. 6 is a second portion of the operational flow chart of the non-volatile memory packaging system.

Referring now to FIG. 6, therein is shown a second portion of the operational flow chart 501 of the non-volatile memory packaging system 100, of FIG. 1. The write command decode 526 proceeds to a latch address block 602, in which the address pointers and the length of the command are stored for subsequent processing. The flow then proceeds to check a RAM full comparator 604, which is a hardware circuit that compares the remaining capacity of the random access memory 132 of FIG. 1 and determines if the pending write command will overflow the remaining capacity.

If the RAM full comparator 604 determines that the pending write command will overflow the capacity of the random access memory 132 the flow proceeds to a copy RAM data to Flash block 606. The copy RAM data to Flash block 606 causes the module controller 116, of FIG. 1, to move the content of the random access memory 132 through the routing multiplexer 112, of FIG. 1, to the non-volatile memory 128, of FIG. 1.

It has been discovered that the module controller 116 can move the content data from the random access memory 132 to the non-volatile memory 128 faster than the normal access time of a flash memory product. This is achieved by a bus width advantage in the internal architecture of the non-volatile memory packaging system 100 between the random access memory 132 and the non-volatile memory 128.

At the completion of the process of the copy RAM data to Flash block 606 the flow proceeds to clear a RAM capacity counter 608, zeroing the counter, which results in setting a RAM empty flag. Zeroing the RAM capacity counter 608 allows the flow to proceed to a write RAM block 610 which sets the address pointers for the transfer in preparation for the transfer of data to the random access memory 132. The actual transfer will be managed by the module controller 116. If the RAM full comparator 604 determines that the pending write command will not overflow the capacity of the random access memory 132 the flow proceeds directly to the write RAM block 610.

It has been discovered that the non-volatile memory packaging system 100 can reduce the data transfer time by a factor of 1000, once the data transfer commences. This aspect of the invention is provided by the module controller 116 managing the random access memory 132 as a data cache prior to any actual write to the non-volatile memory 128. When the data cache is combined with the internal bus width advantage of the non-volatile memory packaging system 100 the result is a non-volatile memory device that can perform in the range of 50 to 100 times faster than traditional flash memory based memory devices.

The flow then proceeds to an assert ready block 612 in order to activate the ready (RDY/BSY_N) line of the system control bus 106, of FIG. 3. By asserting the ready line, the non-volatile memory packaging system 100 signals the system flash controller 202, of FIG. 2, that the data transfer is ready to commence. The flow proceeds to an end of interrupt block 614, which allows the module controller 116 to return to the idle state while the data transfer is managed by a hardware state machine.

The second portion of the operational flow chart 500 also depicts the erase command decode 530, which proceeds directly to a latch address block 616 to save the address pointers of the pending erase command. When the address pointers are latched by the module controller 116, the flow proceeds to a bypass to flash block 618 to process the erase command. The flow then proceeds to an address in RAM check 620. If the address that was targeted by the erase command is present in the random access memory 132, the flow will proceed to a reset RAM address pointer block 622 in order to clear the pointers that reflect the erased data. If the address that was targeted by the erase command is not present in the random access memory 132 or the address pointers found in the random access memory 132 are reset, the flow will proceed to the assert ready block 612 in order to indicate that the erase is complete. The flow then continues to the end of interrupt block 614 to allow the module controller 116 to await the next command.

Figure 7:
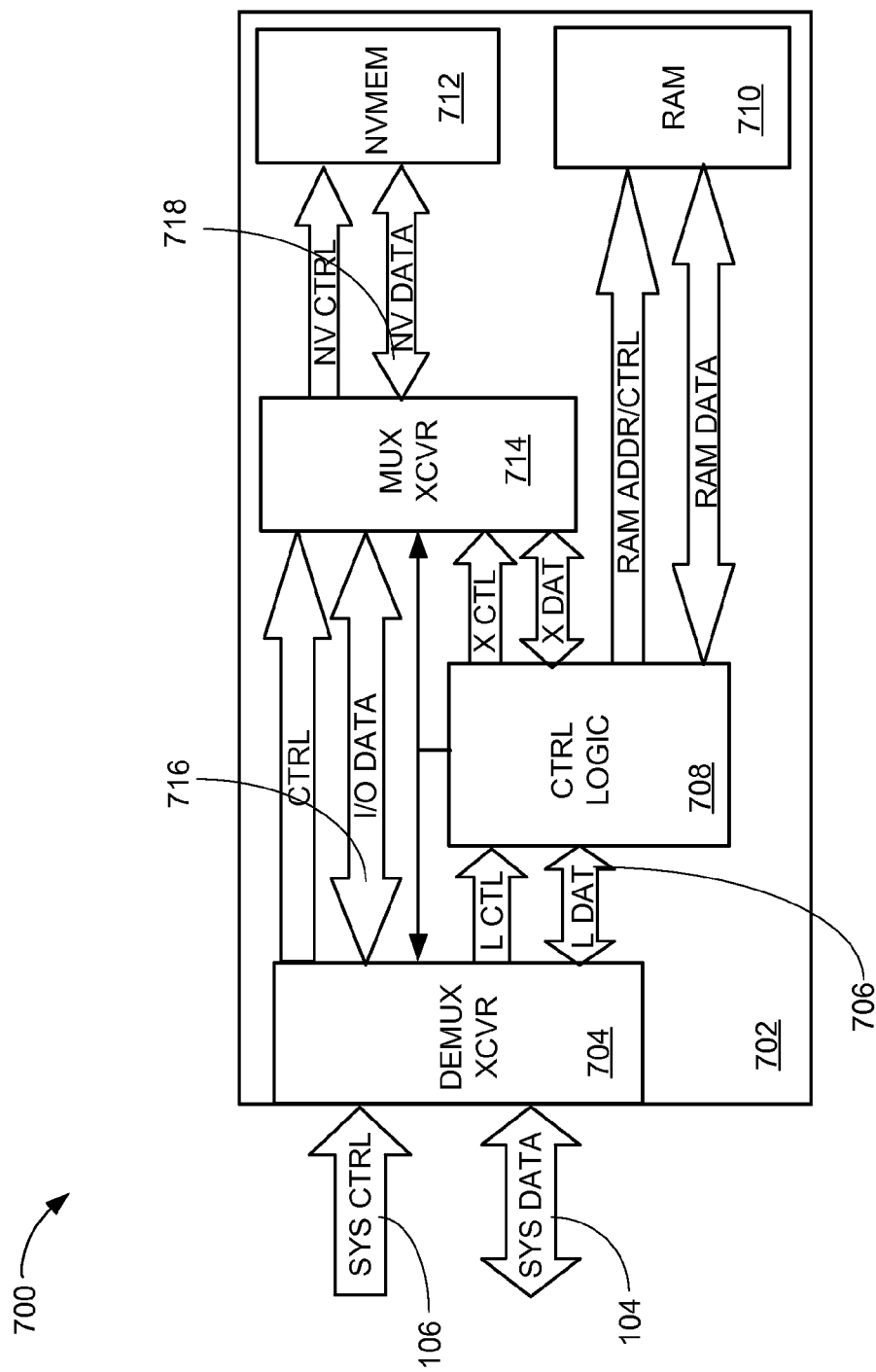
FIG. 7 is a detailed chip level functional block diagram of the non-volatile memory packaging system in an alternative embodiment of the present invention.

Referring now to FIG. 7, therein is shown a detailed chip level functional block diagram of a non-volatile memory packaging system 700 in an alternative embodiment of the present invention. The detailed chip level functional block diagram of the non-volatile memory packaging system 700 depicts an integrated circuit 702 having an interface transceiver 704. The interface transceiver 704 can perform preliminary data processing of the system data bus 104 and the system control bus 106. The preliminary data processing can include shifting a data bus width, managing the timing for a latched data bus 706 between the interface transceiver 704 and a control logic module 708, and decoding the system control bus 106. It is understood that the system data bus 104 and the system control bus 106 have a standard bit count and timing, but the interface transceiver can have internal bus structures with a different bit count and different control and command codes and lines.

The control logic 708 can include a processor (not shown), with hardware state machine support (not shown). The control logic 708 can manage the movement of data from the interface transceiver 704 to either a random access memory 710 or a non-volatile memory 712. The random access memory 710 can act as a cache buffer to provide enhanced write read performance as compared to a flash memory device (not shown).

An internal multiplexer transceiver 714 can provide a through path for the non-volatile memory 712 to access the interface transceiver 704. The non-volatile memory 712 may directly execute some commands, such as a read ID command, a read status command, or a reset command. All of the data management commands such as read, program page, or block erase can be executed through the control logic 708. In the case of a reset, the command can be executed by both the control logic 708 and the non-volatile memory 712. The control logic 708 would clear the pointers associated with the random access memory 710 in order to complete the reset command.

It is understood that the system data bus 104 is an eight bit standard bus, but the internal data bus structures cab be a different width. As an example, Internal I/O data bus 716 can be eight bits in width, while a non-volatile data bus 718 can be 16 or 32 bits wide. The internal multiplexer transceiver 714 can manage the data routing with the assistance of the control logic 708. The increased bus width of the non-volatile data bus 718 can allow parallel writes and reads of the non-volatile memory 712 in order to boost the data throughput. It has been discovered that the architecture of the non-volatile memory packaging system 700 can provide a non-volatile memory, in the form of the integrated circuit 702, which provides an increase in performance of between 100 and 1000 times that of currently available Flash memory devices.

Figure 8:
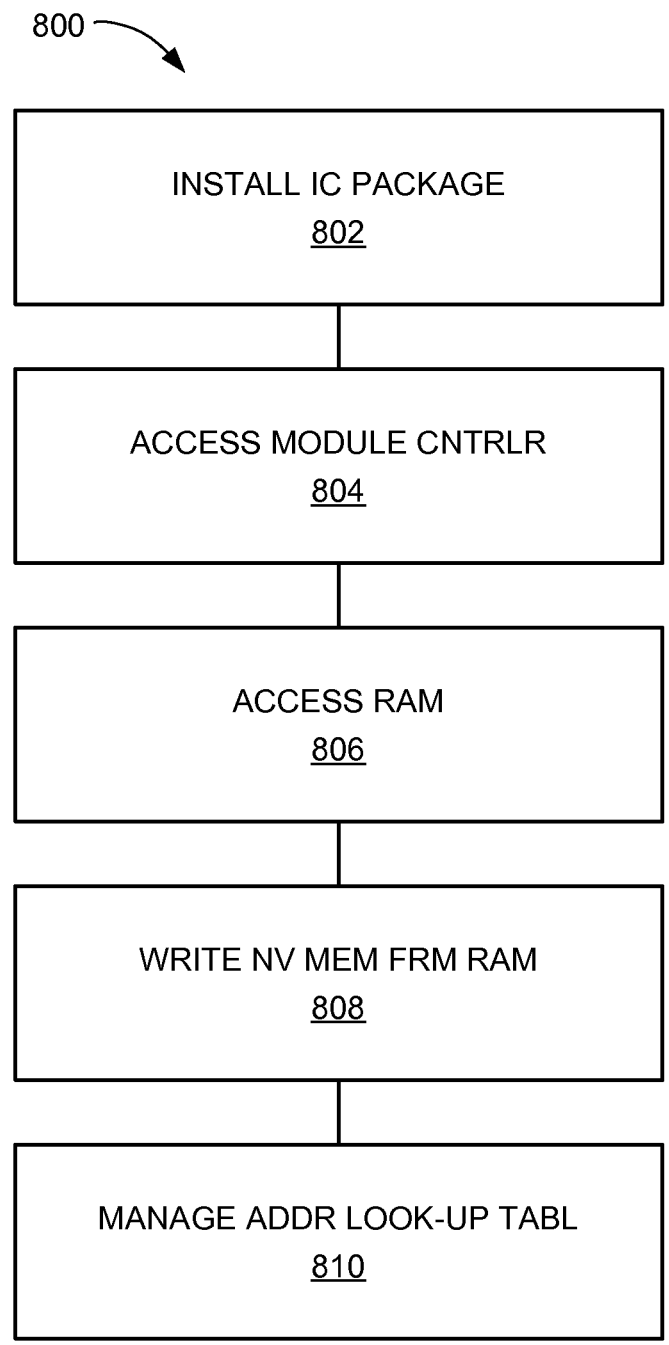
FIG. 8 is a flow chart of a method of operation of the non-volatile memory packaging system in a further embodiment of the present invention.

Referring now to FIG. 8, therein is shown a flow chart of a method 800 of operation of the non-volatile memory packaging system 100 in an embodiment of the present invention. The method 800 includes: addressing an integrated circuit package having a system interface in a block 802; accessing a module controller, in the integrated circuit package, through system interface in a block 804; accessing a random access memory, in the integrated circuit package, by the module controller for storing data from the system interface in a block 806; writing to a non-volatile memory, in the integrated circuit package by the module controller, with the data from the random access memory in a block 808; and monitoring an address look-up register, by the module controller, for reading the data from the non-volatile memory or the random access memory through the system interface in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a non-volatile memory packaging system comprising:
    addressing an integrated circuit package having a system interface;
    accessing a module controller, in the integrated circuit package, through an input register and an output data bus coupled to the system interface;
    accessing a random access memory, in the integrated circuit package, by the module controller for restoring data from a non-volatile memory during power-up diagnostics including writing diagnostic data to the input register and reading the diagnostic data from the output data bus, through the system interface;
    managing a routing multiplexer coupled between the system interface, the non-volatile memory, and the random access memory while the data from the non-volatile memory is restored to the random access memory; and
    monitoring an address look-up register, by the module controller, for reading the data from the non-volatile memory or the random access memory through the system interface.

2. The method as claimed in claim 1 wherein managing the routing multiplexer, by the module controller, includes accessing the non-volatile memory through the system interface.

3. The method as claimed in claim 1 further comprising:
    monitoring a system control bus by the system interface;
    writing the input register with data from the system interface; and
    activating a control decoder by the system interface responding to the system control bus for clocking the input register.

4. The method as claimed in claim 1 wherein writing to the non-volatile memory includes:
    receiving a write command decode by the module controller;
    sampling a random access memory full comparator by receiving the write command decode; and
    zeroing a random access memory capacity counter after moving the data from the random access memory to the non-volatile memory.

5. The method as claimed in claim 1 further comprising receiving an erase command decode by the module controller includes erasing the non-volatile memory.

6. A method of operation of a non-volatile memory packaging system comprising:
    addressing an integrated circuit package having a system interface;
    accessing a module controller, in the integrated circuit package, through an input register and an output data bus coupled to the system interface including activating a command decoder in the module controller;
    accessing a random access memory, in the integrated circuit package, by the module controller for restoring data from a non-volatile memory during power-up diagnostics including writing diagnostic data to the input register and reading the diagnostic data from the output data bus;
    managing a routing multiplexer coupled between the system interface, the non-volatile memory, and the random access memory while the data from the non-volatile memory is restored to the random access memory including loading a speed matching register with the data; and monitoring an address look-up register, by the module controller, for reading the data from the non-volatile memory, the random access memory, or a combination thereof through the system interface.

7. The method as claimed in claim 6 wherein managing the routing multiplexer, by the module controller, includes accessing the non-volatile memory through the system interface including executing a status command by the non-volatile memory.

8. The method as claimed in claim 6 further comprising:
monitoring a system data bus and a system control bus by the system interface;
writing the input register with data from the system data bus through the system interface; and
activating a control decoder by the system interface responding to the system control bus for clocking the input register.

9. The method as claimed in claim 6 wherein writing to the non-volatile memory includes:
receiving a write command decode by the module controller;
sampling a random access memory full comparator by receiving the write command decode; and
zeroing a random access memory capacity counter after moving the data from the random access memory to the non-volatile memory including writing the data from the write command decode into the random access memory.

10. The method as claimed in claim 6 further comprising receiving an erase command decode by the module controller includes erasing the non-volatile memory and resetting a random access memory address pointer.

11. A non-volatile memory packaging system comprising:
an integrated circuit package having a system interface;
a module controller, in the integrated circuit package, accessed through an input register and an output data bus coupled to the system interface;
a random access memory, in the integrated circuit package, coupled to the module controller for restoring data from a non-volatile memory during power-up diagnostics includes diagnostic data written to the input register and read from the output data bus through the system interface;
a routing multiplexer coupled between the system interface, the non-volatile memory, and the random access memory for writing the data from the non-volatile memory to restore the random access memory; and
an address look-up register, in the module controller, for locating the data from the non-volatile memory or the random access memory.

12. The system as claimed in claim 11 wherein the routing multiplexer coupled to the system interface, the module controller, and the non-volatile memory.

13. The system as claimed in claim 11 further comprising:
a system control bus input to the system interface; and
a control decoder activated by the system interface includes the system control bus coupled to the system interface for clocking the input register; and
wherein the input register is written with data from the system interface.

14. The system as claimed in claim 11 wherein the non-volatile memory written includes:
a write command decode from a control decoder detected by the module controller;
a random access memory full comparator activated by the write command decode; and
a random access memory capacity counter cleared after the data from the random access memory is moved to the non-volatile memory.

15. The system as claimed in claim 11 further comprising an erase command decode detected by the module controller includes the non-volatile memory erased.

16. The system as claimed in claim 11 further comprising:
a command decoder in the module controller; and
a speed matching register in the module controller coupled to the random access memory.

17. The system as claimed in claim 16 wherein the routing multiplexer coupled to the system interface, the module controller and the non-volatile memory including a status command executed by the non-volatile memory.

18. The system as claimed in claim 16 further comprising:
a system data bus and a system control bus input to the system interface; and
a control decoder activated by the system interface coupled to the system control bus for clocking the input register; and
wherein the input register is written with data from the system data bus through the system interface.

19. The system as claimed in claim 16 wherein the non-volatile memory written includes:
a write command decode from a control decoder detected by the module controller;
a random access memory full comparator activated by the write command decode;
a random access memory capacity counter cleared after the data from the random access memory is moved to the non-volatile memory; and
a system data bus copied to the random access memory by the module controller.

20. The system as claimed in claim 16 further comprising an erase command decode detected by the module controller includes the non-volatile memory erased and a random access memory address pointer reset.

\* \* \* \* \*